United States Patent Office.

BENJAMIN J. CHRISTIE, OF LEADVILLE, COLORADO.

NON-CONDUCTING COVERING FOR STEAM-PIPES, &c.

SPECIFICATION forming part of Letters Patent No. 477,647, dated June 28, 1892.

Application filed February 19, 1892. Serial No. 422,161. (No specimens.)

*To all whom it may concern:*

Be it known that I, BENJAMIN J. CHRISTIE, a citizen of the United States of America, residing at Leadville, in the county of Lake and State of Colorado, have invented a new and useful composition of matter to be used as a non-conducting covering for steam-pipes, steam-boilers, and whatever may be used for the generation and conveyance of steam, of which the following is a specification.

My composition of matter consists of the following ingredients, combined in the proportions and applied as stated below, to wit:

The "first application," as it is called, consists of fire-clay, five pints; plaster-of-paris, five pints; cotton-dust, (refuse and waste from cotton-mills,) one pound; one gallon of rusty water, one-fourth pound of alum, and one-fourth pound of flaxseed, boiled together one-half hour, one pint; pure water, sufficient to make a thin mortar of above ingredients.

The second application consists of plaster-of-paris, one-fourth pound; fire-clay, one-fourth pound; cotton-dust, one pound; pure water, sufficient to make a mortar of the ingredients in this second application.

The third application consists of fire-clay, four pounds; cotton-dust, one pound; sawdust, one-half pound; pure water, sufficient to make a mortar of the ingredients in this third application.

The fourth application, which is also the last, consists of cotton-dust, one pound; plaster-of-paris, four pounds, these two ingredients to be mixed with one pint of the composition described in the first application above—to wit, one gallon of rusty water, one-fourth pound of alum, and one-fourth pound of flaxseed, boiled together one-half hour; pure water, sufficient to make a mortar of the ingredients in this fourth application.

The first application above described is to be applied to the pipe or other steam boiler or chest with a brush or broom and is for the purpose of making the pipe rough, so that the succeeding applications as above given may adhere firmly to the pipe so prepared.

The second application is applied about a quarter of an inch thick over the first and after the first one has been allowed to dry thoroughly.

The third application is put over the second with a trowel, and if an extra thickness of the covering is required this application may be repeated as often as desired.

The fourth application, as all the others, is mixed well together into a mortar for the purpose of application to the pipes, boilers, &c. The fourth application is then polished with brush and trowel and then painted with asphaltum.

In using the above-described composition the pipes, boilers, and other vessels for generating or holding and carrying steam should first be freed from all grease and dirt, which can be done by washing them thoroughly with a brine made of salt and rusty water. The rusty water above mentioned is simply water in which iron has been allowed to rust until it has colored the water.

By the use of the above composition the heat is prevented from escaping from the steam through the pipes or boilers, and through pipes so covered with the composition, as described above, steam may be conveyed to a distance and kept at a certain pressure with less consumption of fuel than would be necessary without the said covering. The composition is fire-proof and is a non-conductor of heat.

I am aware that certain coverings—such as asbestus, asbestus-paper covering, and magnesia-paper or some such material—put on the pipes with a band of iron have been used and are in use for coverings for steam-pipes, boilers, &c., whether patented or unpatented I could not say; but I am not aware that the above composition has ever been so used at any time by any other person or persons.

What I claim, and desire to secure by Letters Patent of the United States, is—

The above-described composition of matter to be used for covering steam-pipes, boilers, T-joints, elbows, valves, domes of boilers, and other vessels for generating, holding, and carrying steam to prevent the escape or waste of heat, which composition consists of water, cotton-dust, or refuse from cotton-mills, fire-clay, sawdust, plaster-of-paris, alum, flaxseed, and rusty water in the proportions specified above.

BENJAMIN J. CHRISTIE.

Witnesses:
JOHN M. MAXWELL,
CHAS. LAVENDER.